United States Patent
Okamura

(10) Patent No.: US 6,275,783 B1
(45) Date of Patent: Aug. 14, 2001

(54) LOGGING TECHNIQUE FOR TRANSMISSION SYSTEM

(75) Inventor: Haruhiko Okamura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/201,256

(22) Filed: Nov. 30, 1998

(30) Foreign Application Priority Data

Mar. 20, 1998 (JP) ................................. 10-072170

(51) Int. Cl.⁷ ................................ G06F 15/167
(52) U.S. Cl. .................... 702/187; 340/870.09; 705/44
(58) Field of Search ............................. 702/187, 79, 125, 702/176, 180; 340/870.09; 62/126; 705/44; 713/1

(56) References Cited

U.S. PATENT DOCUMENTS

| | | | |
|---|---|---|---|
| 3,824,550 | * 7/1974 | Schoenwitz | 340/870.09 |
| 4,625,276 | * 11/1986 | Benton et al. | 705/44 |
| 5,423,000 | * 6/1995 | Kimura et al. | 713/1 |
| 5,437,163 | * 8/1995 | Jurewicz et al. | 62/126 |

FOREIGN PATENT DOCUMENTS

| | | |
|---|---|---|
| 4-84251 | 3/1992 | (JP) . |
| 6-6421 | 1/1994 | (JP) . |
| 6-314220 | 11/1994 | (JP) . |

\* cited by examiner

*Primary Examiner*—Kamini Shah
*Assistant Examiner*—Edward Raymond
(74) *Attorney, Agent, or Firm*—Helfgott & Karas, P C.

(57) ABSTRACT

To use logging areas with no empty spacing left and trace back the logs to the past, a logging system is provided. Information to be logged includes data and management information managing the data. The logging system comprises memory having a management area and a data area, and a writing element for writing not only management information into the management area with a fixed length but also data into at least one of the data area and the management area. The writing element comprises a member for writing the management information about the data to be written in the data area into the management area with the fixed length and a member for sequentially writing the data into the data area with variable lengths according to the management information. The writing element further comprises a member for determining whether or not the data are less than in size a fixed-length area of the management area, a member for writing the data into the management area when the data are less than in size the fixed-length area, and a member for writing not only the data into the data area but also an address for the data written into the management area, the address being adopted as the management information, when the data are not less than in size the fixed-length area.

4 Claims, 9 Drawing Sheets

MANAGEMENT FLAGS:
(b15) DATA FLAG:
"1" SHOWS DATA POINTER AND "0" SHOWS DATA.
(b14) TRANSMITTING/RECEIVING FLAG:
"1" SHOWS TRANSMISSION AND "0" SHOWS RECEPTION.

FIG. 4
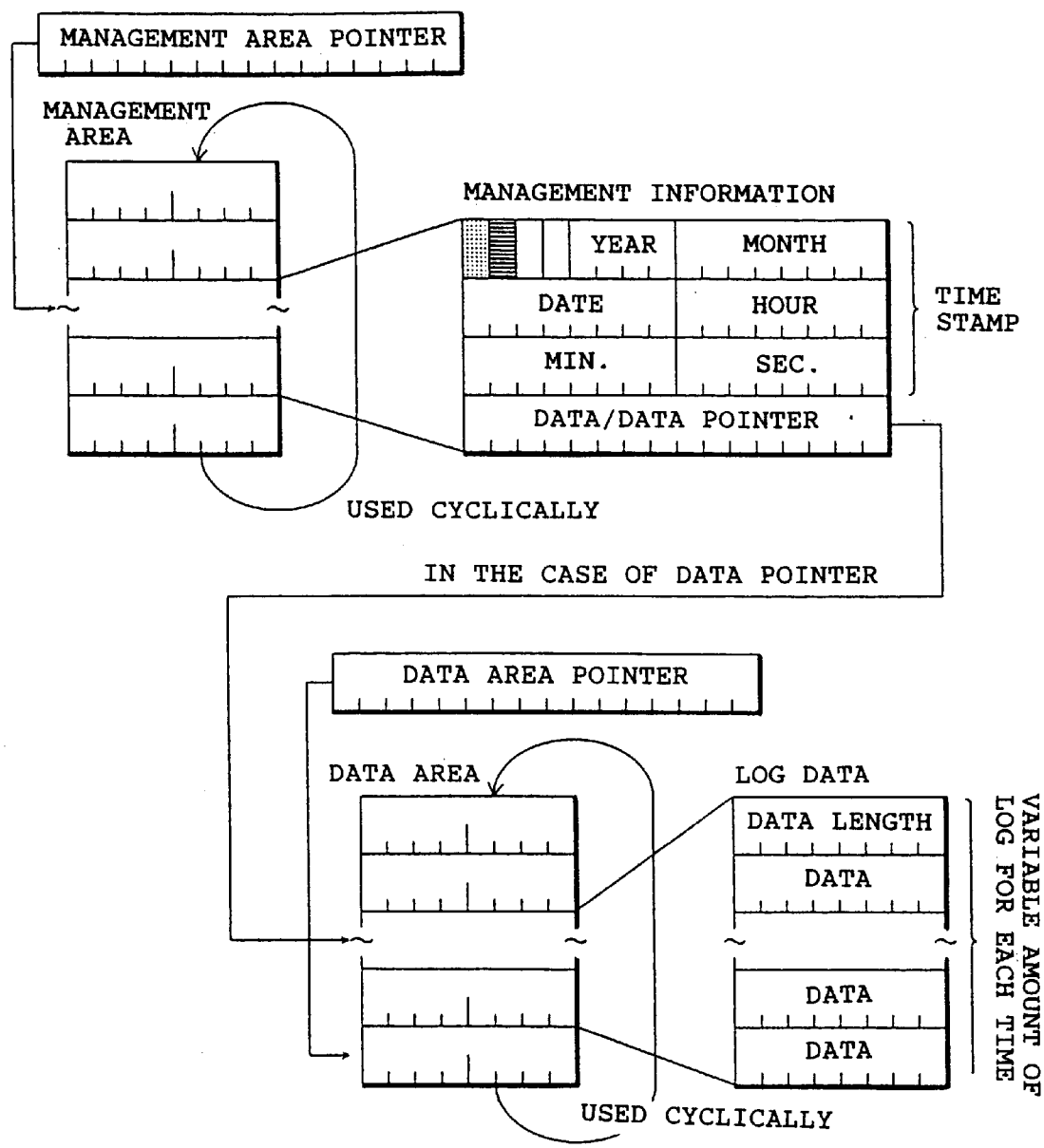
MANAGEMENT FLAGS:
 (b15) DATA FLAG:
"1" SHOWS DATA POINTER AND "0" SHOWS DATA.
 (b14) TRANSMITTING/RECEIVING FLAG:
"1" SHOWS TRANSMISSION AND "0" SHOWS RECEPTION.

LOGGING TECHNIQUE FOR TRANSMISSION SYSTEM

BACKGROUND OF THE INVENTION

The present invention relates to a technique for efficiently acquiring such logs as communication logs and alarm logs in transmission systems.

As conventional techniques for writing communication logs, there are methods of writing data to be logged with fixed lengths and writing data to be logged with variable lengths.

FIG. 1 shows the former method of writing logs as fixed-length data.

In the system shown in FIG. 1, such variable-length data as communication data transmitted between processors and/or data indicative of alarm occurrences caused by errors in communication are written with a fixed length. For writing those data, a log area pointer is used to specify an address at which log information should be written next time, as shown in FIG. 1. When information to be logged is generated due to communication and others, the information is written into an address in a log area specified by the log area pointer. Although such unfixed data as the foregoing communication data and/or alarm data are written in a log area as logged information, fixed-length areas are secured in the log area. The log area pointer is made to go forward by a quantity corresponding to a fixed-length area, thus specifying the next address at which data is to be written next time.

In such log writing way, if the log files are desired to be traced backward into the past, tracing the pointer on a condition that an address corresponding to a known fixed-length area is reduced each time easily can show how log data are written in the past.

In contrast, the way shown in FIG. 2 is used to write such variable-length data as communication data or data showing alarm occurrence as log files by storing those variable-length data into each variable-length log area. As shown in FIG. 2, a log area pointer designates the next address at which log information will be written. In the case that information to be logged arises due to performing communication and others, the information is written at an address in the log area currently specified by the log area pointer. The information to be logged in a log area is made up of a data length and data, and the data length indicates a quantity of log data written. The log area pointer is made to go forward by an amount of "data amount +2", so that it indicates the next data-writing position.

Another conventional technique similar to the above is disclosed by a Japanese Patent Laid-open (KOKAI) publication No. 6-314220 as a method of searching update start points of data storage files. Specifically, every access to data storage files with fixed-length records, the logging date and time and the file size of a final record is preserved in a different file. For data storage files of variable-length records, the logging date and time, record length, and file size of a final record are preserved in a different file.

For performing accumulation processing for data storage files, it takes time to accumulate from its top file. Thus, in order to restrict the processing to a new range produced after the last accumulation processing, data updated (update start point) after the last accumulation processing are searched using the logging date, record length (only for variable-length records), and file size of the final record which have been preserved in the different file.

Another conventional technique for log information collection method is disclosed by a Japanese Patent Laid-open (KOKAI) publication No. 6-6421. This shows a writing technique for securing data buffer areas and log areas within a memory of a channel system with the object of increasing efficiency in memory use as well as facilitating its management. In order to accomplish those objects, the Japanese Patent Laid-open (KOKAI) publication No. 6-6421 uses pointers A and B which indicate respectively the upper and lower ends of a log area and pointers C and D which indicates respectively the top and bottom ends of log data with a given length. If an empty area is made between the pointers A and C or between the pointers B and D, a data buffer area is secured within the empty area, and the log area is updated by moving the pointers A and B to the upper and lower ends of a remaining area made by excluding the secured data buffer area from the log area. In contrast, if an empty area does not yield between the pointers A and C or between the pointers B and D, a data buffer is prohibited from being secured. Repeating the same procedure as the above, the log areas and the data buffer area are secured for data to be logged inputted in sequence. In this disclosed technique, an alternative approach is that, by moving the pointers A and B to the upper and lower ends of an area including a data buffer area, the data buffer area is taken into the log area.

The way shown in FIG. 1 requires all the logs to be equal in log length. Therefore, in logging variable-length data such as communication data, if the data are less than in length a fixed-length area, areas in which no data are written are produced, preventing an efficient use of a logging area.

In particular, in transmission systems, it is carried out that alarms are read from their hardware units every 1sec., as a typical value. Thus logging alarm information as-read from the hardware units requires a huge amount of logging area. One countermeasure to avoid this problem is to perform degeneracy processing with alarm information, and to write the processed data. However, owing to the fact that the degeneracy processing collects a plurality of pieces of alarm information into one piece of alarm information, it is impossible to obtain the as-read alarm information from the hardware units from the logs formed by data which experienced the degeneracy processing. It is often not to obtain necessary information in such cases as tracing failures.

In the way shown in FIG. 2, the log area pointer sustains only an address at which the next writing is done and areas wherein log data are written are variable-lengths. Hence, if trying to trace the log data to the past to read them in sequence in the ascent order, it is impossible to obtain information showing at where a certain log to be traced starts, resulting in failures in reading.

Therefore, both of the logging with a fixed length and the logging with variable lengths have advantages and disadvantages.

Additionally, the foregoing publication No. 6-314220 provides only an update start position at or after the last access. Moreover this publication technique absolutely requires the logging date and time of the final record and the file sizes. Further, according to this publication, there is a possibility that the top of the data files stored may be deleted due to the limitation in the file size. Accordingly, the date and the record length of the final record at the last update are required (only in the case of variable-length records).

The foregoing other publication No. 6-6421 discloses a technique by which a memory incorporated in a channel apparatus can be used with no unused area left. But this technique focuses on only an arrangement of areas for log files and buffers into the same area in a suitable way.

Accordingly, it is an object of the present invention to provide a logging system capable of efficiently using logging areas with no empty spacing left and efficiently tracing back the logs to the past.

SUMMARY OF THE INVENTION

In order to solve the object, the present invention employs the following configuration. According to one aspect of the present invention, there is provided a logging system for a transmission system, wherein the logging system records, as a log, information to be logged concerning communicated information, the information to be logged including data and management information managing the data, the logging system comprising: memory means having therein a management area and a data area both adopted for logging the information to be logged; and writing means for writing not only the management information (such as a data pointer which specifies addresses for data) into the management area with a fixed length but also the data into at least one of the data area and the management area. It is preferred that the writing means comprises means for writing the management information about the data to be written in the data area into the management area with the fixed length and means for sequentially writing the data into the data area with variable lengths according to the management information (e.g., according to addresses shown by the data pointer).

Preferably, the writing means comprises means for determining whether or not the data are less than in size a fixed-length area of the management area, means for writing the data into the management area when the data are less than in size the fixed-length area, and means for writing not only the data into the data area but also an address for the data written into the management area, the address being adopted as the management information, when the data are not less than in size the fixed-length area.

Data less than in size the fixed-length area of the management area are, for example, transmission control characters. To the contrary, data not less than in size the fixed-length area are normal communication data and others.

Furthermore, it is preferred that the communicated information is information about alarm occurrence and recovery from failures, and, like the communication data, the writing means comprises means for comparing the data written last time and the information about alarm occurrence and recovery from failures to be written this time in the second time of logging and its succeeding times of logging, and means for writing the information about alarm occurrence and recovery from failures only when the comparing means shows that the information about alarm occurrence and recovery from failures to be written this time differs from the data written last time.

It is also preferred that, without logging alarm information as-read from the hardware, only a different piece of information residing between the data written last time and the information about alarm occurrence and recovery from failures to be written this time. Thus, amounts of log data can be lowered.

According to the present invention, variable-length communication data and others can be logged in a state that an area used for one log in a management area is set to a fixed-length. Because of this, for reading logs, a management area pointer can be used to easily trace back the logs in sequence from new ones to old ones. Since communication data and others can be logged into a data area with variable lengths, the data area can be used efficiently.

Concerning the alarm logs, only when differences are found between a reading result of the last time and a reading result of this time, data are logged, resulting in reduced amounts of information to be logged. Particularly, logging only the differences can record almost the same information as that logged based on alarm information as-read from the hardware, with less amounts of logs. Like the logs of communicated information, arranging the management area and the log area enables an easy sequential backward reading of the variable-length logs from new ones to old ones.

BRIEF DESCRIPTION OF THE DRAWINGS

In the accompanying drawings:

FIG. 4 is an illustration showing one embodiment for logging of communication data;

DESCRIPTION OF THE PREFERRED EMBODIMENTS

Referring to the accompanying drawings, a preferred embodiment of the present invention will be described. In the present invention, a term "communicated information" means all kinds of information communicated between processors incorporated in an information processing system, between information processing systems, or others, which are objectives to be logged.

Figure 1:
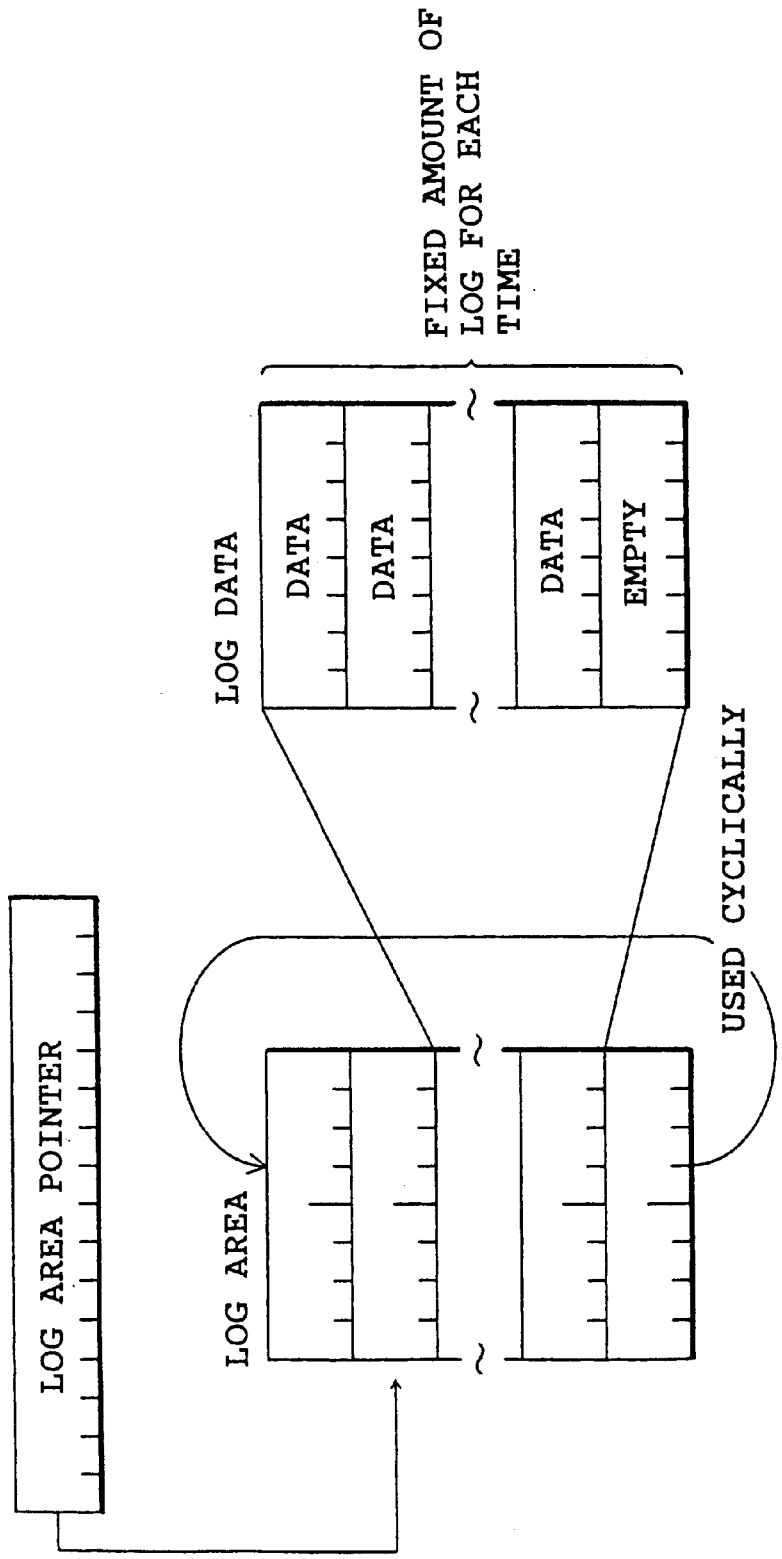
FIG. 1 shows one example illustrating the logging with a fixed length according to the prior art.
Figure 2:
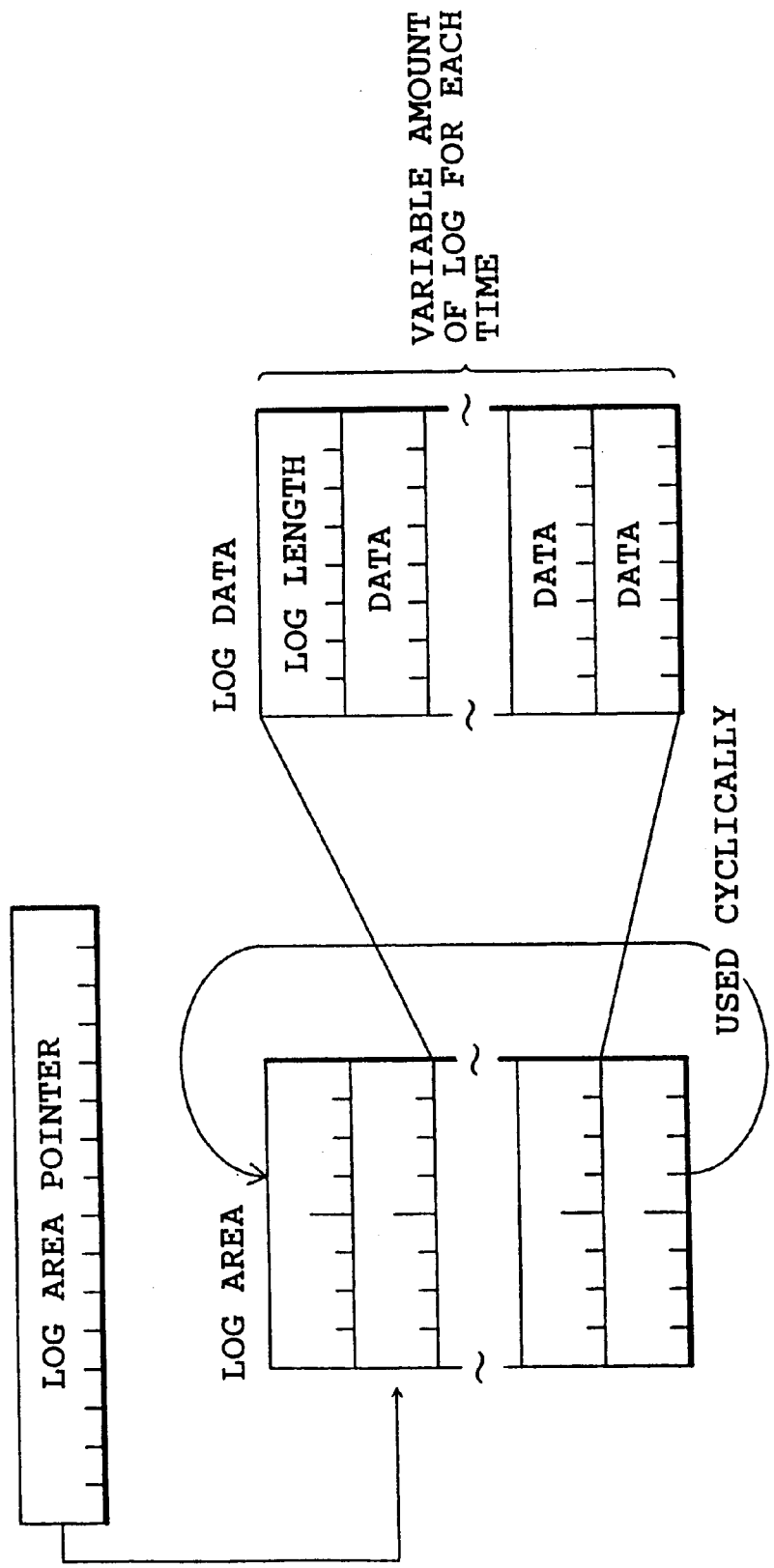
FIG. 2 shows one example illustrating the logging with fixed lengths according to the prior art.
Figure 3:
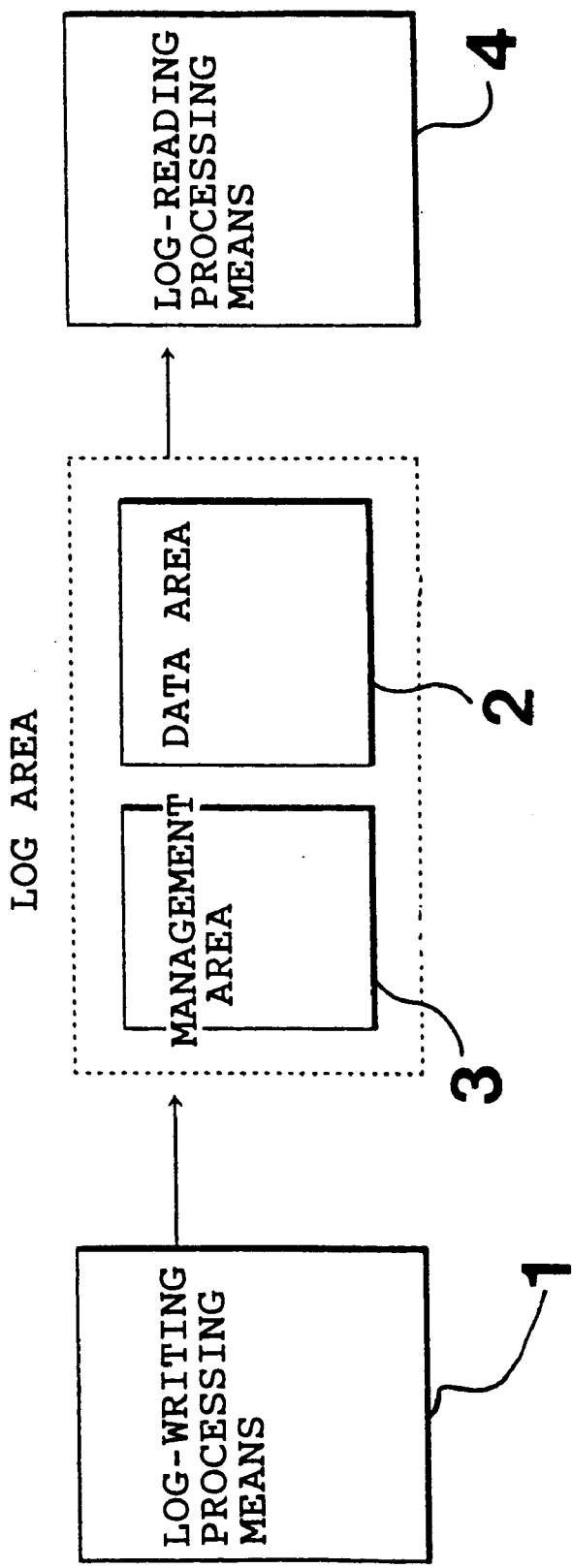
FIG. 3 is a block diagram showing the principle configuration of the present invention.

FIG. 3 is a block diagram representing a basic configuration of a logging system according to the present invention.

As shown in FIG. 3, a log-writing processing means 1 is realized by a central processing unit of an information processing system not shown. The log-writing processing means 1 secures a log area (area for logging) in a memory, and writes communicated information into this log area. The log area has a data area 2 into which data to be logged are written as communicated information and a management area 3 into which management data necessary for management in association with writing in the data are written. For writing, a data pointer pointing at an address for data logging in the data area 2 is written with a fixed-length into the management area 3 to which a management area pointer points, and in the data area to which a data area pointer points, log data are sequentially stored with variable-lengths at addresses specified by the data pointer. In addition to the data pointer, management information about the log data written in the data area are written into the management area 3. The management area pointer holds an address in the management area at which the next writing will be done.

Further, as shown in FIG. 3, the central processing unit of the information processing unit not shown realizes a log-reading processing means 4. The means 4 goes back sequentially in the management area 3 by the fixed-length, so that it reads management information, especially reads the data pointer, and reads corresponding variable-length log data.

Figure 5:
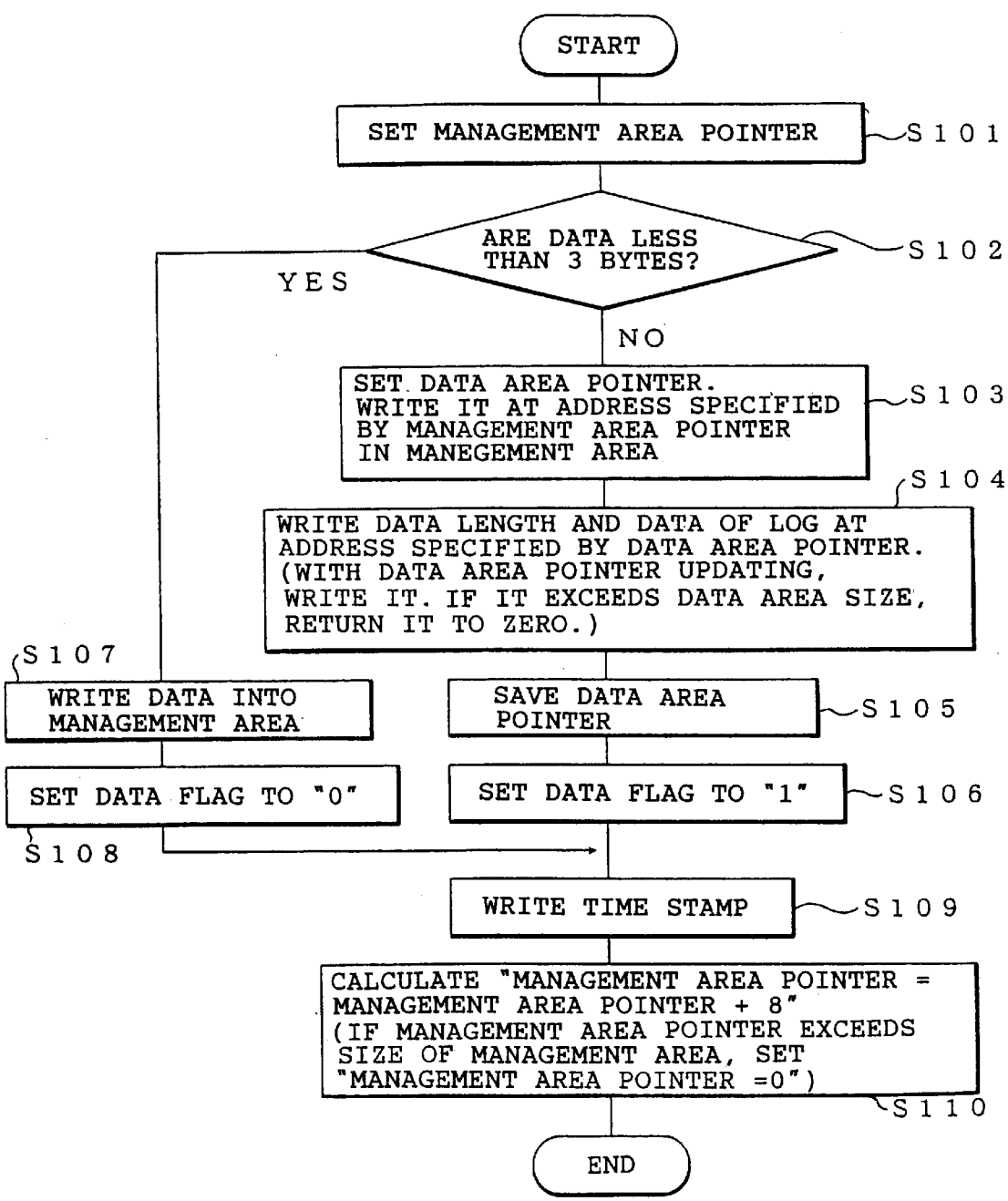
FIG. 5 is a flowchart illustrating a series of procedures of writing data to be logged.
Figure 6:
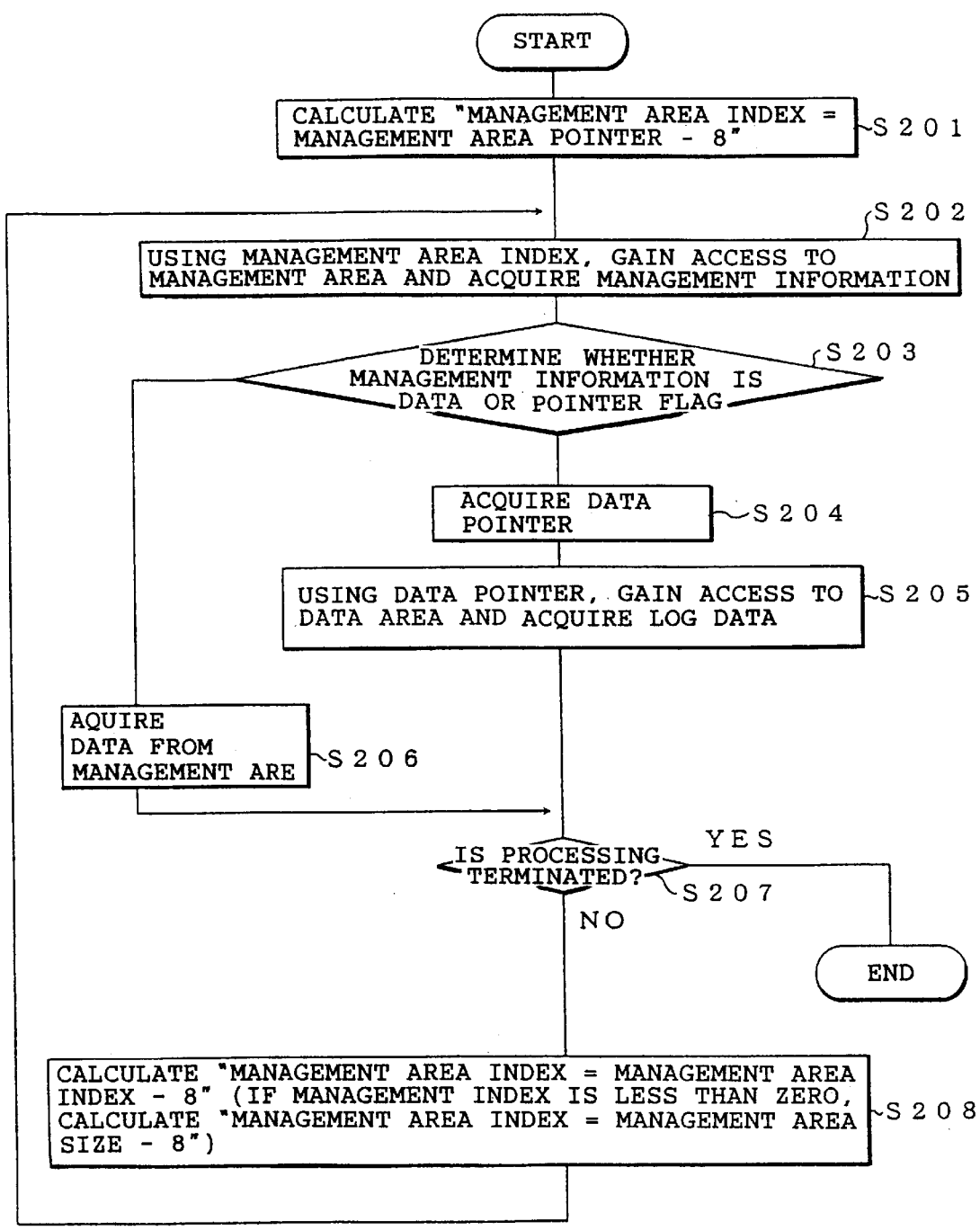
FIG. 6 is a flowchart illustrating a series of procedures of reading logged data.

Log files of information communicated between processors of a transmission system will now be explained. FIG. 4 shows one example in which the configurations of a management area pointer, management area, data area pointer, and data area are illustrated. FIG. 5 is a flowchart for writing data to be logged, while FIG. 6 is a flowchart for reading logs.

The management area pointer holds an offset address at which the next information should be written in the management area. The management information occupies eight bytes every one log.

A transmitting/receiving flag determines if data to be written are transmitted data or received data, and set "1" for transmission and "0" for reception. In the case that data to be written consists of data of 2 or more bytes, like communication data, a management flag, time stamp, and pointer to the data area are written. In this case, the data flag is set to be "1".

The pointer to the data area uses an offset address in the data area, which is held by the data area pointer so as to be used next time. Communication data etc. to be written includes data and the number of the data written at locations specified by the pointers associated with the data areas written in the management area. When writing the communication data into both the management area and the data area has been completed, the number "eight" is added to the management area pointer. Whenever the management area pointer to which "8" was added exceeds the management area, it is returned to the top position of the management area, enabling a cyclic use of the management area. As a further step, the data area pointer is subjected to addition which permits the next written area to be specified in agreement with an amount of communicated information written. When the data area pointer exceeds the data area, it is also returned to the top position of the data area, providing a cyclic use of the data area.

Referring to FIG. 5, a method of writing data to be logged will be explained. In cases information required to be logged is generated, processing of writing data is performed according to a flowchart shown in FIG. 5.

Since the management area pointer holds an address at which the next management information will be written, this address is acquired (S101). As the next step, it is determined if data to be logged is less than 3 bytes or not(S102).

In the case that data to be written is less than 3 bytes, because of the data being transmission control characters or others, only the management area is used to A write a management flag, a time stamp, and data. By this processing, such transmission control characters as "ACK (0x06)" or "NACK(0x15)" are written into the management area (S107), and a data flag is set to be "1" (S108).

If data to be logged is 3 or more bytes, a data area pointer is set to be written into the management area (S103). The data length of a log file and data to be logged are then written into a position at which the data area pointer residing in the data area points (S104). The data to be logged is written with the data area pointer updated, during which processing the data area pointer is returned to "0" when it exceeds the data area size. Thus the data area is used cyclically. When completing writing of data into the data area, the data area pointer is saved (S105), and the data flag is set to "1" (S106).

A time stamp is then written into the management area (S109). Furthermore, in order to make the management area pointer point to an address at which the next management information will be written, an amount "8" corresponding to the size of the management area used for logging one piece of information is added to the management area pointer. In cases the management area pointer becomes larger than the size of the management area, the management area pointer is returned to "0", thereby providing a cyclic use of the management area (S110).

Referring to a flowchart in FIG. 6, a series of procedures for reading logged data (logs) will now be described. When logged data are read out, the management area pointer points to an address at which the next management information will be written. Hence a management area index is assigned to an address made by subtracting "8" from a value of the management area pointer (S201). The value "8" corresponds to the size of the management area for one log file.

Owing to the fact that the management area index shows an address in the management area written last time, a corresponding management area is read using the index (S202). Furthermore, using the data flag which exists in the management information, it is determined whether data are present in the data area or not, namely, whether or not they are such data as transmission control characters or communication data (S203).

When the data flag is "1", data in the data area are communication data. In such case, since the data pointer is written in the management information, the data pointer is set (S204), then the logged data are read from the data area using the set data pointer (S205). In contrast, when the data flag is "0", logged data are composed of such data as transmission control characters, which are less than 3 bytes, then the logged data are read from the management area (S206).

Performing the foregoing steps S202 to S206 can read logged data corresponding to one piece of management information. It is then determined whether the reading of log files should end or not through comparison between user-requested information about the number of log files as well as the size of the management area and the number of log files which have been read so far (S207). Where the determination in step S207 is that the reading was completed, the processing will terminate. By contrast, the determination is that the reading will be continued, a new management index is produced by subtracting from the current management area index a size "8" of the management area for a log, and returned to the initial step S202 (S208).

In this subtraction processing, in cases where the subtracted management area index results in amounts less than "0", the management area index is updated to "management area size −8".

Logging for communication error information will be carried out as follows, for example. When a communication error occurs, processing for retry is performed. Thus, information showing how many times the retry processing has been performed is written as a log. The log for the number of times of the retry processing are written into only a log management area differently in area from the logs for communication data. Into the log management area for communication errors, the time stamp and the times of the retry processing are written by an area of 2 bytes per log.

Figure 7:
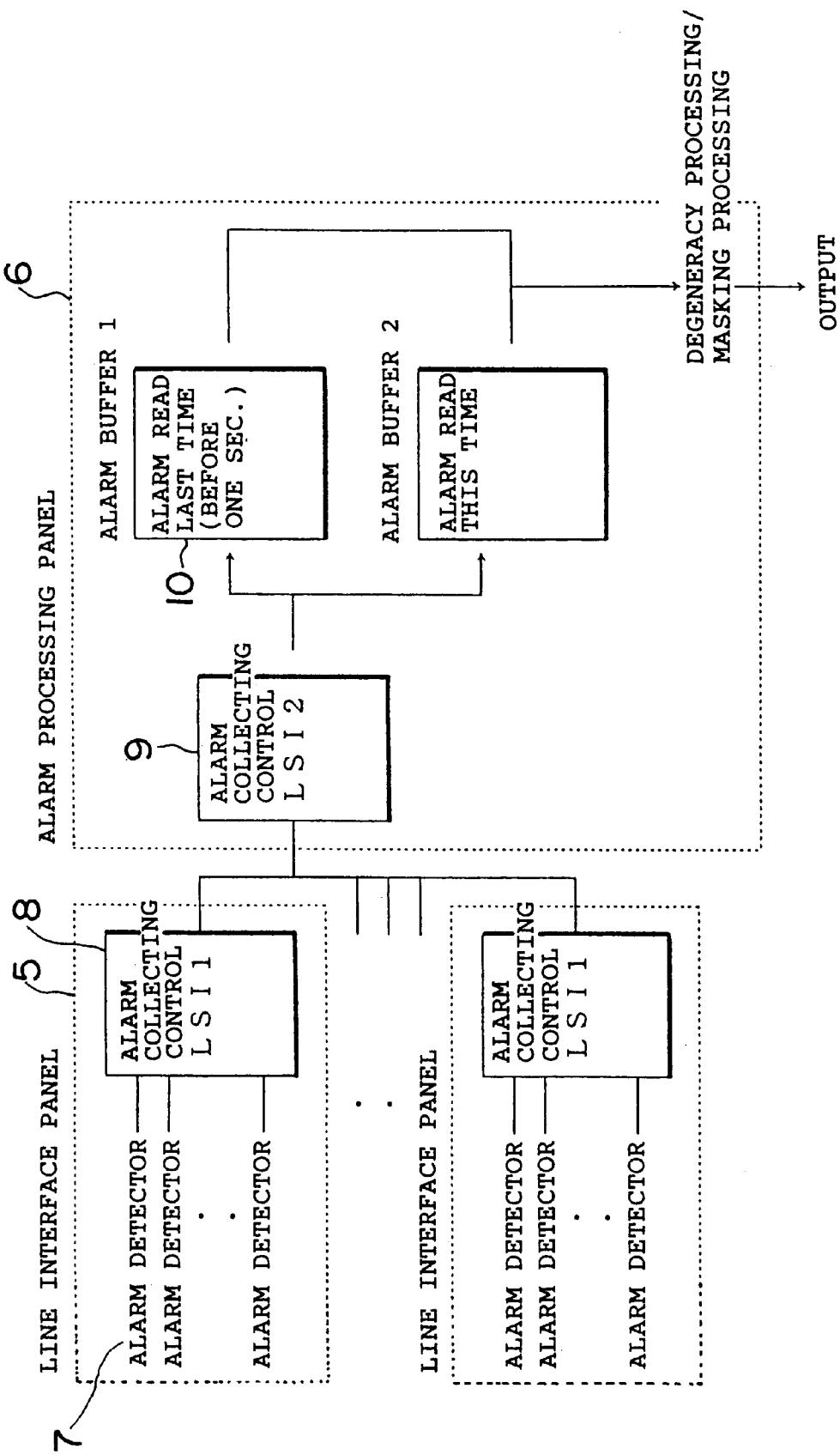
FIG. 7 is a block diagram showing a configuration for alarm processing.
Figure 8:
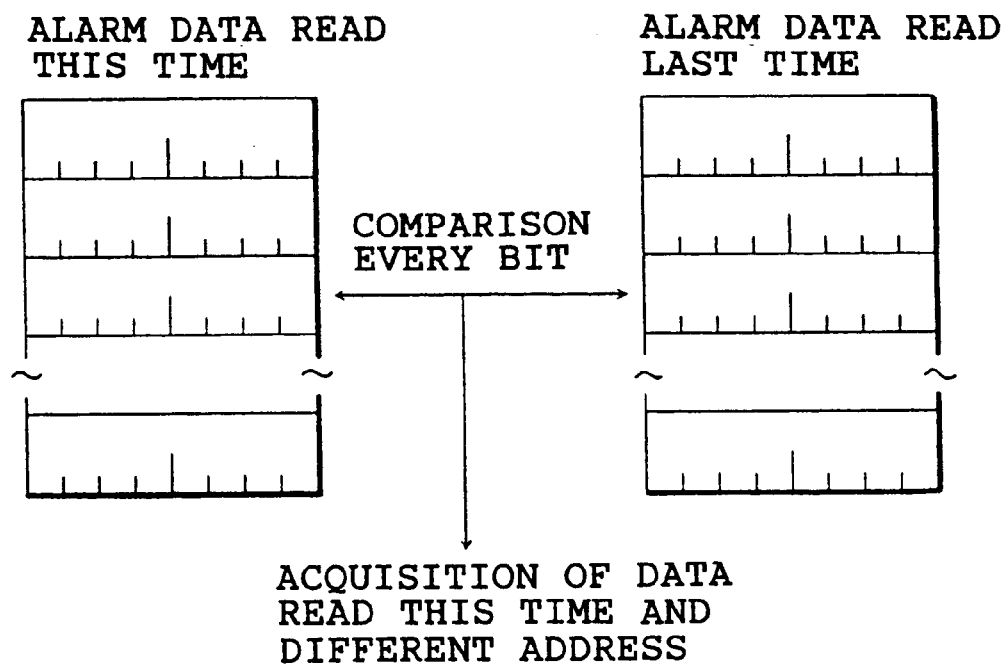
FIG. 8 is an illustration explaining a method of forming information to be logged from alarm information.
Figure 9:
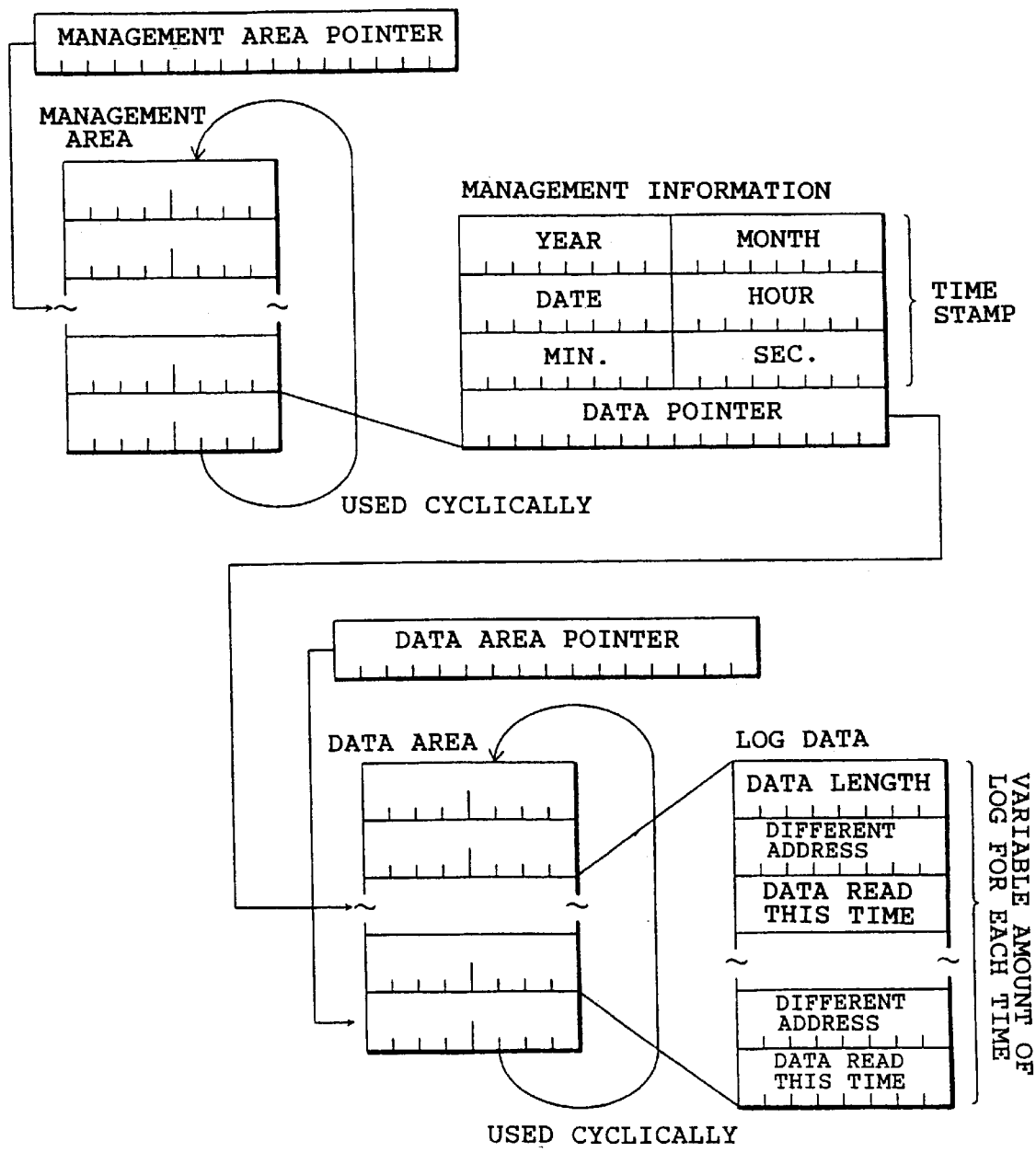
FIG. 9 is an illustration explaining the logging of the alarm information.

Referring to FIGS. 7 to 9, alarm processing will be described.

An information processing system is provided with a line interface panel 5 and an alarm processing panel 6. The line interface panel 5 includes alarm detectors 7 as well as an alarm collecting control (LSI1) 8, wherein alarms detected by the detectors 7 are sent to the control LSI1.

The alarm processing panel 6 has a microprocessor in which an alarm collecting control (LSI2) 9 and alarm buffers 10. The microprocessor controls the alarm collecting control LSI2 every given time (for example, 1 sec.) to collect alarms from each line interface panel 5. In response to a command from the microprocessor, the alarm collecting control LSI2 sends an alarm collecting command to the alarm collecting control LSI1 of each line interface panel 5. The alarm collecting controls LSI1 sends to the alarm collecting control LSI2 alarms which have been collected from each alarm detector 7 responsively to the alarm collecting command. The alarm collecting control LSI2 receives data concerning the alarms, and write them into an alarm buffer designated.

Writing into the alarm buffers is carried out in an alternate fashion every collection of alarms (for example, every 1 sec.), i.e., this time, they are written into one alarm buffer (1), and next time, they are into the other buffer (2). The alarms thus-written are subjected to degeneracy processing and others, being supplied to a monitor apparatus or others. Logging for alarm information will be performed as follows. The alarm information is detected by each alarm detector as information of one bit. If an alarm is generated, the alarm information is "1", while if no alarm is generated, it is "0". By way of example, when a receiving light beam was shut off in a transmission line realized by an optical fiber, the bit 0 at the first byte (address=0) of alarm information becomes "1", and when the synchronization of frames failed in the transmission line, the bit 1 thereat also becomes "1". In addition, if a receiving light beam in another transmission line was shut off, the bit 0 at another address 8 turns to "1", for example. In this example, even when either one of the off state of a receiving light beam or the failure in frame synchronization may occur, one collected alarm (i.e., one error in reception) is sent to an upper monitor apparatus. Such processing by which alarms detected by a plurality of alarm detectors are collected to one alarm to be outputted is called "degeneracy processing." On the contrary, processing that alarms occurring in a system triggered by one alarm which occurred therein is masked and not outputted is called "masking processing" (in this case, only the first alarm causing the succeeding alarms is outputted).

Alarm information read from the line interface panels 5 and others is temporarily stored in an alarm buffer for the degeneracy processing or masking processing, and the stored information is kept therein until the next alarm reading. At the next alarm reading, a subtraction is performed between alarm information which was read last time and has been kept so far and alarm information which is newly read this time. When the subtraction was performed, the location and data are written as a log. This logging is the same as that for communication data described above. That is, its management information is written into a log management area, the subtraction data for alarms are written into an address to which a pointer included in the management information points. For reading the alarm logs, the same procedure as that for communication data described before is applied.

Thus, according to the above embodiment, variable-length communication data and others can be logged in a state that an area used for one log in a management area is set to a fixed-length. Because of this, for reading logs, a management area pointer can be used to easily trace back the logs in sequence from new ones to old ones. Since communication data and others can be logged into a data area with variable lengths, the data area can be used efficiently.

In addition, in cases differences are found between alarm information read this time and alarm information read last time, alarm logs are made by logging only different pieces of information between them. This makes it possible to log, with less amounts of logs, almost the same content as that of as-read alarm information. Like the logs of communication information, arranging the management area and the log area enables tracing back the logs of variable-lengths from new ones to old ones in turn.

Still, comparison with the cited prior art publications is given below, in which a variety of features are provided for this embodiment.

While the Japanese Patent Laid-open (KOKAI) Publication No. 6-314220 allows only retrieval of update start points residing later than the last access, this embodiment enables retrieval of almost all the logs written in a log witting area from the last log in the temporal ascent order. Furthermore, this published technique absolutely requires the logging the date and time of the last record, the length thereof, and the file size. However, the present embodiment requires only data pointers. Furthermore, this published technique requires the date and the record length of the final record at the last update (only in the case of variable record lengths), because the top of data file stored may have been deleted due to the limitation in the file size. To the contrary, the data pointer is written in a different area (i.e., management area), which enables retrieval of almost all the logs written in the log witting area in the temporal ascent order.

On one hand, the Japanese Patent Laid-open (KOKAI) Publication No. 6-6421 provides a technique for efficiently using a memory of a channel apparatus with no unused area remaining, only providing a log writing area and a data buffer which are well arranged in the same area. In contrast, the present embodiment uses both the management area and the log writing area in order to writing logs, enabling retrieval of almost all the logs written in the log writing area in the temporal ascent order, in totally different way from the published technique.

Numerous other modifications and variations of the present invention will be apparent to those skilled in the art in view of the foregoing description. Thus, it is to be understood that, within the scope of the appended claims, the present invention may be practiced other than as specifically described hereinabove.

What is claimed is:

1. A logging system for a transmission system wherein the logging system records, as a log, information to be logged concerning communicated information, the information to be logged including data and management information managing the data, the logging system comprising:

memory means having therein a management area and a data area for logging the information to be logged; and writing means for writing not only the management information into the management area with a fixed length but also the data into at least one of the data area and the management area, wherein the writing means comprises means for writing the management information about the data to be written in the data area into the management area with the fixed length and means for sequentially and cyclically writing the data into the data area with variable lengths according to the management information.

2. The logging system of claim 1, wherein the writing means comprises means for determining whether or not the data are less than in size a fixed-length area of the management area, means for writing the data into the management area when the data are less than in size the fixed-length area, and means for writing not only the data into the data area but also an address for the data written into the management area, the address being adopted as the management information, when the data are not less than in size the fixed-length area.

3. The logging system of claim 1, wherein the communicated information is information about alarm occurrence and recovery from failures, and the writing means comprises means for comparing the data written last time and the information about alarm occurrence and recovery from failures to be written this time in the second time of logging and its succeeding times of logging, and means for writing the information about alarm occurrence and recovery from failures only when the comparing means shows that the information about alarm occurrence and recovery from failures to be written this time differs from the data written last time.

4. The logging system of claim 3, wherein the information writing means for writing the information about alarm occurrence and recovery from failures consists of means for writing only a different piece of information residing between the data written last time and the information about alarm occurrence and recovery from failures to be written this time.

* * * * *